United States Patent
Collins et al.

(10) Patent No.: US 8,131,036 B2
(45) Date of Patent: Mar. 6, 2012

(54) COMPUTER-AIDED DETECTION AND DISPLAY OF COLONIC RESIDUE IN MEDICAL IMAGERY OF THE COLON

(75) Inventors: Michael J. Collins, Beavercreek, OH (US); Senthil Periaswamy, Beavercreek, OH (US); Robert V. Uitert, Hollis, NH (US); Justin Kunz, Milford, NH (US)

(73) Assignee: iCAD, Inc., Nashua, NH (US)

( * ) Notice: Subject to any disclaimer, the term of this patent is extended or adjusted under 35 U.S.C. 154(b) by 881 days.

(21) Appl. No.: 12/179,787

(22) Filed: Jul. 25, 2008

(65) Prior Publication Data

US 2010/0021026 A1    Jan. 28, 2010

(51) Int. Cl.
G06K 9/00    (2006.01)

(52) U.S. Cl. .......................................................... 382/128

(58) Field of Classification Search .................. 382/128, 382/131
See application file for complete search history.

(56) References Cited

U.S. PATENT DOCUMENTS

| | | | |
|---|---|---|---|
| 6,331,116 B1 | 12/2001 | Kaufman et al. | |
| 6,947,784 B2 | 9/2005 | Zalis | |
| 7,236,620 B1 | 6/2007 | Gurcan | |
| 2004/0165767 A1* | 8/2004 | Gokturk et al. | 382/159 |
| 2005/0107691 A1 | 5/2005 | Zalis | |
| 2005/0152587 A1 | 7/2005 | Sirohey et al. | |
| 2006/0215896 A1 | 9/2006 | Sirohey et al. | |
| 2007/0071298 A1* | 3/2007 | Kiraly et al. | 382/128 |
| 2008/0027315 A1 | 1/2008 | McGinnis | |
| 2008/0118133 A1* | 5/2008 | Sirohey et al. | 382/131 |
| 2008/0273781 A1 | 11/2008 | Manduca et al. | |
| 2010/0260390 A1* | 10/2010 | Liang et al. | 382/128 |

FOREIGN PATENT DOCUMENTS

| | | |
|---|---|---|
| WO | WO-2007030132 | 3/2007 |
| WO | WO-2007048091 | 4/2007 |
| WO | WO-2007054842 | 5/2007 |
| WO | WO-2007064981 A2 | 6/2007 |
| WO | WO-2008089492 | 7/2008 |

OTHER PUBLICATIONS

Nappi et al., "Automated detection of polyps with CT colonography: evaluation of volumetric features for reduction of false-positive findings", *Acad. Radiol.*, 2002; 9:386-97.

Pickhardt, P. J., et al., "Missed Lesions at Primary 2D CT Colonography; Further Support for 3D Polyp Detection," *Radiology*, Feb. 2008; 246(2): 648-649.

* cited by examiner

*Primary Examiner* — W. B. Perkey
(74) *Attorney, Agent, or Firm* — William A. Loginov, Esq.; Loginov & Associates, PLLC (57) ABSTRACT

Methods and systems are presented that improve a radiologist's ability to identify polyps by automatically and more accurately detecting and displaying colonic residue such as tagged or untagged stool or colonic fluid in medical images of the colorectal region. A virtual colonography imaging system obtains medical imagery of the colon. Improved computer-aided detection (CAD) algorithms identify colonic residue in the imagery by calculating feature vectors of and using statistical classification methods to classify regions of colonic residue to distinguish them from false positives.

47 Claims, 6 Drawing Sheets

COMPUTER-AIDED DETECTION AND DISPLAY OF COLONIC RESIDUE IN MEDICAL IMAGERY OF THE COLON

BACKGROUND

Colon cancer is the second leading cause of cancer death among men and women in the United States. Many colon cancers could be prevented if precursor colonic polyps were detected and removed. In the last decade or so, computed tomographic (CT) and magnetic resonance (MR) colonography, two new "virtual" techniques for imaging the colon, have emerged as providing benefits over optical colonoscopies, the traditional standard for detecting and removing polyps. CT, MR, and other virtual colonography techniques take views through the abdomen using scanners, and then construct a three-dimensional model of the colon using computer software. The result is a set of images that provides a radiologist with a virtual view of the colon similar to what a gastroenterologist would see using an optical colonoscope. According to the National Cancer Institute and other well-known authorities on virtual colonography, advantages include that the techniques are relatively quick, fairly sensitive, and only minimally invasive.

As radiologists review the images of a virtual colonography procedure, they look for structures indicative of colonic polyps. Colonic residue (e.g. stool, fluid) structures may share many of the same characteristics of and often appear like colonic polyps in the imagery, especially in three-dimensional (i.e. volumetric) rendered images of the colon. Colonic residue also may obscure polyps from the view of the radiologist. For example, stool or fluid can partially or completely cover polyps. As a result, colonic residue may have a significant impact on the sensitivity with which radiologists detect cancerous polyps and properly diagnose a patient.

There have been numerous solutions proposed for addressing the problem of colonic residue in virtual colonography imagery. In the past, patients were asked to ingest a heavy laxative to remove all colonic residue from the colon prior to imaging. In response to complaints of discomfort expressed by patients, a minimal prep procedure was developed in which patients consumed an agent that tagged the colonic residue prior to imaging, causing the pixels or voxels of colonic residue to appear extremely bright on the rendered image(s) of the colon. Companies developed digital subtraction algorithms that electronically removed the tagged colonic residue from the image(s), presenting the radiologist with imagery in which the colonic residue has been replaced by air. Examples of digital subtraction algorithms can be seen in references such as U.S. Pat. No. 6,947,784; U.S. Patent Applications 20050107691, 200602158968, 20080027315, and 20080118133; and WO Application No. 2007030132. Unfortunately, in some cases, the agent may poorly tag the colonic residue and thus the digital subtraction algorithms may not effectively remove the residue from the imagery while leaving all other portions of the image. The algorithms may inadvertently remove or alter pixels or voxels of tissue-like regions in the image that include polyps and/or the colon wall. This may reduce the efficacy with which a radiologist detects and/or characterizes polyps and thus may reduce the accuracy with which the radiologist diagnoses a patient. Thus, many radiologists desire the flexibility to see the tagged colonic residue in the image in the event that what is tagged as colonic residue is actually a polyp. Thus, automatic electronic subtraction may provide an incomplete solution to the problem of colonic residue.

Rather than simply automatically electronically remove the identified colonic residue from the imagery, companies have turned their attention to computer-aided detection (CAD) algorithms as an automatic way of distinguishing polyps from colonic residue. Examples of CAD algorithms for detecting polyps in the presence of colonic residue can be seen in references such as U.S. Patent Application 20070071298, WO Application No. 2007064981, and "Automated detection of polyps with CT colonography: evaluation of volumetric features for reduction of false-positive findings," *Acad. Radiol.*, 2002; 9:386-97 by Nappi et al. While these algorithms may be effective, they do not operate at 100% sensitivity. Thus, such CAD algorithms may report false positives (that is, they may report a region as a polyp that is not one), fail to report true positives (that is, fail to report a true polyp), and rely on the radiologist to resolve these errors. More specifically, these CAD algorithms may misclassify polyps exhibiting colonic residue-like characteristics (e.g. tagged polyps, polyps obscured by stool, polyps that exist in regions of the colon having a high amount of colonic residue, etc.) as colonic residue. The CAD algorithms also may misclassify colonic residue exhibiting polyp-like characteristics (e.g. poorly tagged stool, stool obscuring polyps, etc.) as polyps.

The previously described approaches are all focused on detecting colonic residue for purposes of subtracting it from the colon imagery and/or improving the efficacy of automated polyp detection within the colon imagery. There is a need, however, for an alternative approach to dealing with colonic residue that overcomes the limitations of these approaches. In particular, there is a need for improved CAD algorithms to automatically detect colonic residue at a higher accuracy than prior art approaches for purposes of displaying the colonic residue to a radiologist. Such an approach could help the radiologist to better distinguish colonic residue from polyps in medical images of the colorectal region, thus improving the quality of patient diagnosis and treatment.

It is therefore an object of this disclosure to assist a radiologist in identifying polyps by automatically detecting and outputting regions of colonic residue in medical imagery of the colon.

SUMMARY

Methods and systems for automatically detecting and displaying colonic residue (tagged or untagged stool, colonic fluid) to a radiologist are presented. A virtual colonography imaging system obtains medical imagery of the colon. Computer-aided detection (CAD) algorithms automatically identify colonic residue in the imagery by calculating feature vectors and using statistical classification methods to distinguish colonic residue true positives (i.e., regions of true colonic residue) from false positives (i.e., regions that may display colonic residue features but are not colonic residue). Colonic residue detections that result are output to the radiologist via a display device and depicted specially from the rest of the imagery. The output of colonic residue in the colon may enable radiologists to distinguish polyps exhibiting stool-like characteristics (e.g. tagged polyps, polyps obscured by stool, polyps that exist in regions of the colon having a high amount of colonic residue, etc.) from stool exhibiting polyp-like characteristics (e.g. poorly tagged stool, stool obscuring polyps, etc.)

DETAILED DESCRIPTION

In the following detailed description of embodiments, reference is made to the accompanying drawings that form a part hereof, and in which are shown, by way of illustration and not by way of limitation, specific embodiments in which the methods and systems disclosed herein may be practiced. It is to be understood that other embodiments may be utilized and that logical, mechanical, and electrical changes may be made without departing from the scope of the methods and systems disclosed herein.

Before describing the methods and systems disclosed herein, it is first useful to understand a general purpose system used in a clinical setting for acquiring and processing imagery of the colon. This system is exemplary of systems upon which the methods disclosed herein may be practiced.

Acquisition and Processing of Colon Medical Imagery

Figure 1:
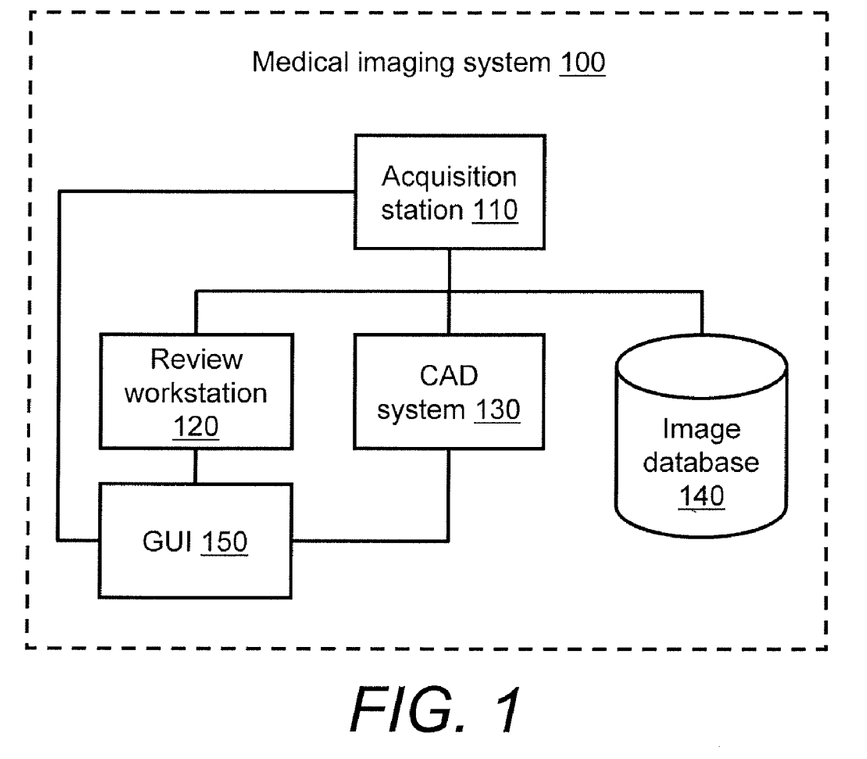
FIG. 1 is an illustration of a conventional virtual colonography imaging system as known in the prior art for obtaining medical imagery of the colon and processing the imagery with computer-aided detection (CAD) algorithms.

Referring now to FIG. 1, a conventional virtual colonography imaging system 100 for acquiring medical imagery of the colon and processing the imagery with computer-aided detection (CAD), as known in the prior art, is presented. This system may be utilized to carry out prior art methods, or to carry out the novel methods disclosed herein. The system is described for reference purposes only; other types and variations of virtual colonography imaging systems may acquire medical imagery of the colon for processing in accordance with the methods disclosed herein.

Virtual colonography imaging system 100 includes an acquisition station 110 for performing an abdominal scan procedure of a human and acquiring a series of images of the colonic region. An abdominal scan may be performed using computed tomography (CT), magnetic resonance imaging (MRI), or another method for virtually imaging a patient's colonic region. Examples of vendors that provide CT and MRI scanners for colonography include the General Electric Company of Waukesha, Wis. (GE); Siemens AG of Erlangen, Germany (Siemens); and Koninklijke Philips Electronics of Amsterdam, Netherlands.

Acquisition station 110 connects to and communicates with a review workstation 120, a computer-aided detection (CAD) system 130, and/or an image database 140 via any type of communication interface which may include, but is not limited to, physical interfaces, network interfaces, software interfaces, and the like.

Review workstation 120 is a computer processing device that contains various algorithms and software implemented in executable program code. These algorithms and software construct and display three-dimensional (3-D) image volumes of the colon using the image data acquired by acquisition station 110. They may also display two-dimensional (2-D) images of the colon using the image data. Review workstation 120 is typically connected to and communicates with a graphical user interface (GUI) 150, such as a monitor or other output device for graphically displaying the constructed 3-D colonic imagery and/or 2-D colonic imagery. However, in other embodiments of virtual colonography imaging system 100, CAD system 130 or acquisition station 110 is connected to and communicates with GUI 150. Examples of commercially-available review workstations for CT colonography include V3D-Colon™ from Viatronix, Inc. of Stony Brook, N.Y.; Aquarius Workstation from TeraRecon, Inc. of San Mateo, Calif.; and InnerviewGI™ from Vital Images, Inc. of Minnetonka, Minn.

CAD system 130 is a computer processing device that contains algorithms implemented in executable program code for processing the colon imagery with CAD. As is known in the art, CAD algorithms are built upon various image processing techniques for the automatic detection of polyps and colonic residue, as further described herein. Companies currently working on CAD systems for CT colonography include iCAD, Inc. of Nashua, N.H.; Medicsight PLC of London, United Kingdom; and Siemens. In alternative implementations of medical imaging system 100, CAD system 130 may physically reside in hardware on review workstation 120 or acquisition station 110.

Finally, virtual colonography imaging system 100 includes an image database 140 for the archived storage, retrieval, and distribution of a patient's medical digital image data and other data related to the patient and his/her case. This data may include, but is not limited to, unprocessed images acquired by acquisition station 110; 3-D image volumes of the colon constructed by review workstation 120; 2-D images of the colon; and CAD data output by CAD system 130. Image database 140 may reside on a computer or network such as a Picture Archiving & Communication System (PACS), which is well-known in the medical industry.

Operation of the virtual colonography imaging system 100 for obtaining medical imagery of the colon and processing the imagery with CAD in accordance with the methods disclosed herein will now be described in greater detail. It is again emphasized that operation in the system of FIG. 1 represents one embodiment of the novel methods disclosed herein, but said methods are not limited to the system of FIG. 1, and may be implemented in alternative structures. Initially, acquisition station 110 acquires a series of imagery data of the patient's abdominal region. The image data may be stored in a Digital Imaging and Communications in Medicine (DICOM) file or other format suitable for reading, writing, and rendering image data for display and visualization purposes. The image data may then be transferred to image database 140 for storage. The image data is sent to CAD system 130 for further processing by CAD algorithms that automatically detect colonic residue (e.g. stool, fluid), as will be described in reference to FIGS. 2-3 hereinbelow. CAD system 130 then renders the acquired medical imagery and colonic residue detections for display on GUI 150, as will be described in reference to FIG. 4 hereinbelow.

It will be understood by a person of skill in the art that the system described may be comprised of components deployed in separate computers, computer processors, or computer systems, or that two or more of the elements of the system, such as acquisition station 110, review workstation 120, CAD system 130, image database 140 and/or GUI 150, may be deployed as parts of a single computer, computer processor or computer system.

Computer-Aided Detection (CAD) of Colonic Residue

Figure 2:
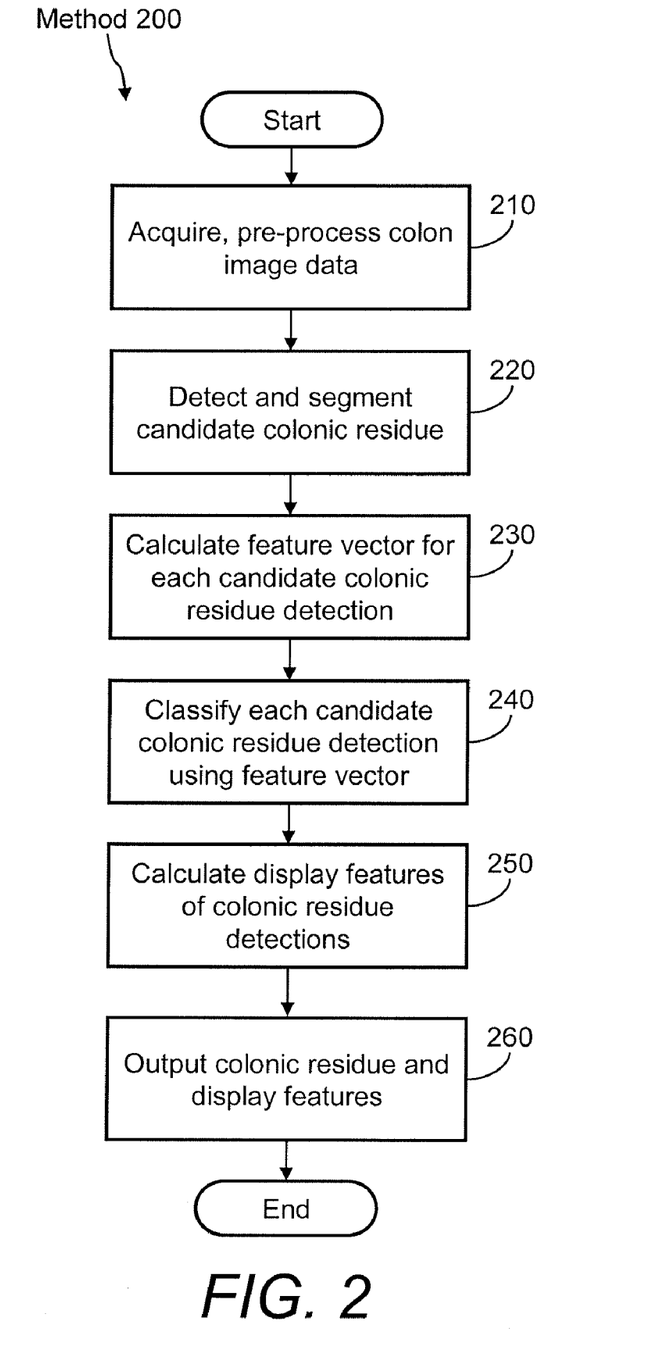
FIG. 2 is a flowchart showing the overall method steps of automatically detecting and outputting colonic residue in colonic medical imagery according to an embodiment of the methods disclosed herein.

Turning to FIG. 2, we will now describe the overall steps of a novel method 200 performed by a CAD system to automatically detect colonic residue in colonic medical imagery. The steps described herein detect and classify colonic residue by classifying candidate regions of colonic residue using novel feature vector calculations and statistical classifiers.

Using medical imaging system 100 in FIG. 1, described above, the following method may be executed by acquisition station 110, review workstation 120, CAD system 130, or suitable combinations of the above components. In addition, the method may be implemented on other systems than that depicted in FIG. 1. However, the method will be described with reference to execution by CAD system 130.

At step 210, the colonic imagery obtained during a virtual colonography scan procedure (as described in reference to FIG. 1) is input to memory of a CAD system for CAD processing. The colonic imagery may be, for example, a 3-D volume of the colon constructed by review workstation 120 from 2-D images acquired by acquisition station 110.

The CAD system optionally may further execute conventional pre-processing steps that are well known in the art, thus modifying and/or segmenting the imagery to improve the efficacy of colonic residue detection by the methods described herein. The pre-processing steps may be stored in self-contained sections of a computer program in the system and may include, for example, smoothing the image, filtering the image (e.g. edge enhancement), segmenting the colon from the rest of the imagery, etc.

At step 220, the CAD system detects colonic residue-like regions in the medical imagery. The colonic residue-like regions identified by these detection operations will include regions of actual colonic residue ("true positives") and/or regions of other structures exhibiting characteristics of colonic residue ("false positives") in each image. Thus, the regions detected at step 220 will henceforth be referred to as "candidate colonic residue detections." The additional steps of method 200 distinguish colonic residue true positives from colonic residue false positives among the candidate colonic residue detections using novel feature vector and statistical classification steps.

In one embodiment, the CAD system described herein executes colonic residue detection algorithm(s) at step 220 as a means to detect all or nearly all of the actual regions of colonic residue (colonic residue true positives) in the colon together with colonic residue false positives. Colonic residue detection techniques are well-known in the art and are primarily used in electronic stool subtraction algorithms. Any of these techniques may be used to accomplish step 220. One specific algorithm is disclosed in pending U.S. Patent Application 20080027315, "Processing and presentation of electronic subtraction for tagged colonic fluid and rectal tube in computed colonography," by iCAD, Inc. In that application, colonic residue-like regions are detected by generating a colonic air mask, generating a colonic fluid mask using the colonic air mask, merging both masks to form a 3-D representation of the colon, resampling the colonic fluid mask to maintain objects of interest such as folds, and finally, removing noise from the colonic fluid mask. The system described therein uses the resulting colonic fluid mask to identify colonic residue-like regions by identifying connected regions using a segmentation process such as region growing, which is well-known in the art.

In an alternate embodiment, rather than identify all (or nearly all) of the actual regions of colonic residue in the full imagery (colonic residue true positives), the CAD system described herein first executes polyp detection algorithm(s) to identify candidate polyps, and then executes colonic residue detection algorithm(s) only in the regions where potential polyps have been detected. This alternate embodiment leads to the detection of colonic residue in the colon exhibiting polyp-like characteristics. These regions have a higher likelihood of being polyps and thus are more important for a radiologist to review and classify than colonic residue detections that do not exhibit polyp-like characteristics. Polyp detection algorithm(s) are well-known in the art and any number of these algorithms may be used to accomplish step 220. One specific algorithm can be seen in U.S. Pat. No. 7,236,620, "Computer-aided detection methods in volumetric imagery," granted to iCAD, Inc. In that patent, polyp-like regions that may include regions of colonic residue are identified using spherical summation techniques. While the embodiment described above is directed towards more accurately providing the radiologist with all potential colonic residue throughout the entire colon, this embodiment provides the radiologist with only the potential colonic residue in the colon that carries the highest risk of being a polyp. Examples of these regions may include polyps tagged by an agent, polyps obscured by stool, and/or polyps that exist in regions of the colon having a high amount of colonic residue. In still other embodiments, only the polyp detection algorithm is run, and the method proceeds to step 230 based upon the results of the polyp detection algorithm alone. In still other embodiments, both colonic residue and polyp detection algorithms may be run independently, and the results of both are combined to generate candidate colonic residue regions for further processing.

In some embodiments, the detection algorithm employed at step 220 further comprises a segmentation operation for modifying the pixels or voxels of heterogeneous colonic residue (i.e. poorly tagged stool) detected by the colonic residue detection algorithm(s) to appear as homogenous colonic residue (i.e. well-tagged stool). Such segmentation operations are known in the art. An example can be seen in WO Application 2007/030132, "Electronic stool subtraction in CT Colonography" in which the voxels from an air mask that are completely surrounded by a tagged stool mask are reclassified into the tagged stool mask. By performing this segmentation operation on candidate colonic residue detections, the methods disclosed herein discriminate both well-tagged and poorly-tagged stool from colonic residue false positives.

At step 230, a feature vector for each candidate colonic residue detection identified at step 220 is calculated. The feature vector can be defined as a set of one or more metrics that measure the characteristics of colonic residue-like regions for purposes of more accurately distinguishing the actual colonic residue true positives from colonic residue false positives such as polyps, folds, etc. This feature vector calculated at step 230 will henceforth be referred to as a "colonic residue feature vector."

In one embodiment, the colonic residue feature vector comprises at least one volumetric feature such as the volume of the region. Volumetric-based features may be included in the colonic residue feature vector as one means to distinguish false positives such as polyps that exhibit volumetric characteristics different from colonic residue true positives. In another embodiment, the colonic residue feature vector comprises at least two features such as, but not limited to, intensity, volume, shape index, curvature, or aspect ratio. By including at least two features in the colonic residue feature vector, a more accurate classification decision boundary (to be described in reference to step 240) can be calculated from multiple feature values than can be calculated using only a single feature. In yet another embodiment, the colonic residue feature vector comprises at least one feature that characterizes the presence of an air pocket or variation of density, homogeneity, or the shape of the colonic-residue-like region. Examples of features that may be suitable for characterizing the presence of an air pocket or variation in density include intensity- and/or gradient-based features. Examples of features that may be suitable for characterizing the homogeneity of stool detections include textural-based features such as edge density or edge magnitude. Examples of features that may be suitable for characterizing shape include irregularity- and/or smoothness-based features. Shape-based features may be included in the colonic residue feature vector as one means to take advantage of the "popcorn-like" shape exhibited by some stool in the colon.

The aforementioned embodiments of the colonic residue feature vector take advantage of characteristics of colonic residue to detect and display regions of colonic residue in the colon with a higher level of accuracy than the prior art detection approaches such as those used in electronic stool subtraction techniques. In addition, the person of ordinary skill in the art will recognize that additional specific features, classes of features, and combinations of features may further be utilized to form the colonic residue feature vector described herein.

At step 240, the CAD system executes a statistical classification algorithm on each colonic residue feature vector calculated at step 230. As is known in the art, a statistical classifier algorithm uses a feature vector to label a region as a specific class, such as "suspicious" or "non-suspicious." Prior art colonic residue detection methods have labeled stool using non-statistical classification approaches such as thresholding. For example, a non-statistical classification approach might label regions above a predetermined intensity value as colonic residue and all regions below the predetermined intensity value as non-colonic residue. As is known in the art, given a particular feature vector, statistical classification algorithms can model the probability distributions of true positives and false positives based on the feature vector with higher accuracy than non-statistical classification algorithms.

Figure 3:
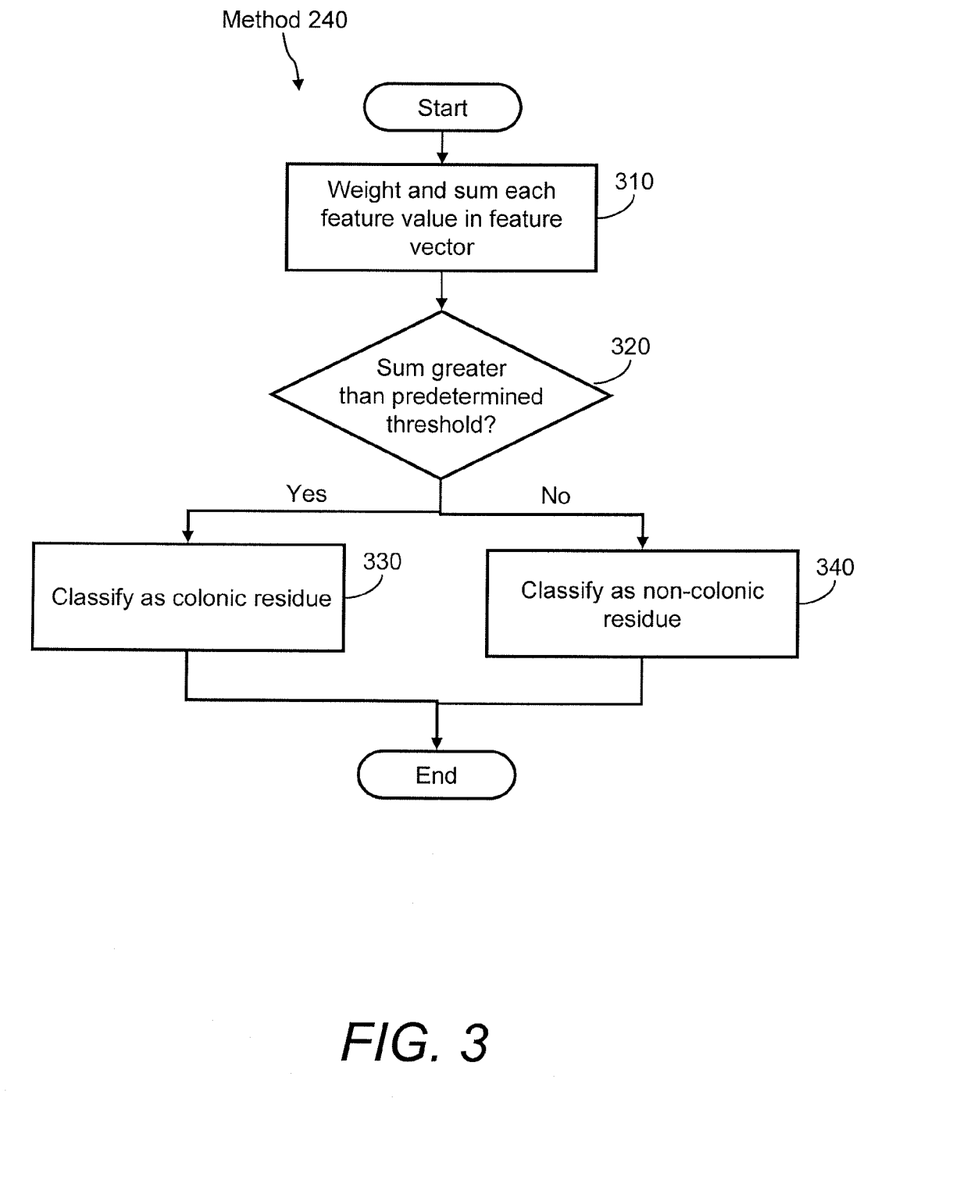
FIG. 3 is a flowchart showing the overall method steps of classifying colonic residue detections in accordance with an embodiment of the methods disclosed herein.

FIG. 3 is a flowchart showing steps corresponding to a linear classification method 300 in accordance with one embodiment. As is known in the art, a linear classifier is one example of a statistical classifier. Assume for a given candidate colonic residue detection that a feature vector is calculated at step 240 in which at least one volumetric-, shape-, intensity-, and gradient-based feature value is calculated for the detection. In accordance with one embodiment, a linear classifier multiples each feature value by a pre-determined weighting factor at step 310, which enables the classifier to consider certain features as more important to the overall decision of suspiciousness. For example, the intensity-based feature could be weighted higher than the volumetric-based feature, as intensity-based features provide more power in discriminating colonic residue from other structures than volumetric-based features. The weighted feature values are summed to compute a single, overall feature value for the region. The overall feature value is compared against a predetermined threshold at step 320, which may be established by computing the same feature vector on known regions of colonic residue and non-colonic residue in a training set (a training set is known in the art), and calculating the overall threshold that best discriminates the colonic residue from non-colonic residue in the training set, taking into account acceptable false positive and false negative rates. If the overall feature value is above the predetermined threshold, the region is labeled as colonic residue at step 330; otherwise, the region is labeled as not colonic residue at step 340.

While FIG. 3 describes one example of a linear classifier algorithm for labeling colonic residue using the feature vector described at step 230, other suitable statistical classifiers for performing step 240 include quadratic classifiers, neural networks, decision-trees, fuzzy logic techniques, support vector machines (SVMs), Bayesian networks, k-nearest neighbors, and other well-known statistical classification approaches as will be known by a person of skill in the art. Step 240 may be further performed using a committee of statistical classifiers, which is well known in the art.

In another embodiment, the statistical classifier described at step 240 may be constructed to form more than two classes. One use of this embodiment may be to identify colonic residue regions that exhibit characteristics of polyps differently from colonic residue regions exhibiting few or no feature characteristics of polyps. For example, summed feature values above the predetermined threshold at step 330 and labeled as colonic residue may be compared against a second threshold, which may be established by computing the same feature vector on regions of colonic residue and "polyp-like" colonic residue in a training set and calculating a second threshold that best discriminates the colonic residue from "polyp-like" colonic residue. If the overall feature value is above the predetermined second threshold, the region is labeled as colonic residue; otherwise, the region is labeled as "polyp-like" colonic residue. As will be fully described below in reference to FIG. 4, the "polyp-like" colonic residue can be specially depicted from all other colonic residue regions exhibiting few or no feature characteristics of polyps on an output device. The utility of such an embodiment is to prompt the radiologist to consider the colonic residue regions exhibiting characteristics of polyps as potential false positives of the automatic colonic residue detection methods disclosed herein. The use of the statistical classifier to form a class of "polyp-like" colonic residue distinct from all other colonic residue can be used in conjunction with or as an alternative to the various embodiments in which detection algorithms identify the candidate colonic residue detections as described at step 220 of FIG. 2.

Outputting Colonic Residue

In addition to viewing colonic residue detections identified by CAD, radiologists may desire to view features of the colonic residue detections that would be useful in further interpreting the detections. These features will henceforth be referred to as "colonic residue display features". Values of these features may be calculated for each colonic residue detection using the feature vector described at step 220. The CAD system can store these values in memory and access them for output and visualization. In another embodiment, these features may be calculated at step 250 because they were not previously calculated at step 220 as part of the feature vector. Exemplary features that may be useful for a radiologist to interpret colonic residue detections include the size of the detection, the segment of the colon in which the detection is located (e.g. rectum, cecum, etc.), the mean intensity of the detection, the probability that the detection is colonic residue, the total amount of colonic residue detected by the methods described herein in a given segment of the colon, etc.

At step 260, the CAD system outputs colonic residue detections and display features for rendering and display. The following approaches are generally well-known for purposes of rendering and displaying. The data may be outputted and stored in a raw binary, Digital Imaging and Communications in Medicine (DICOM), or other file format suitable for reading and rendering image data for display and visualization purposes. The file may be stored in memory or other suitable storage device (e.g. hard drive, CD-ROM, etc.) of any of the components of virtual colonography imaging system 100.

The following embodiments for visualization rendering and display may be executed by acquisition station 110, review workstation 120, CAD system 130, or suitable combinations of the above components. In addition, the methods may be implemented on other systems than that depicted in FIG. 1. However, the embodiments will be described referencing execution by CAD system 130.

CAD system 130 may apply the colonic residue detections and colonic residue display features described above to the image of the colon in several different ways. Using as input the size and location of the colonic residue detections, in a first embodiment, CAD system 130 modifies the data file of colon imagery using the data files of the colonic residue detections. Specifically, CAD system 130 modifies the intensity values of the original colon imagery in the corresponding locations where each detection is identified. Each voxel is overwritten with a different opacity, color, or other suitable overlay technique for visually illustrating that the voxel is part of a colonic residue detection. CAD system 130 may save the modified data file of colon imagery with detections as a new file or simply overwrite the existing data file of colon imagery. In another embodiment, CAD system 130 modifies the data file of colon imagery with colonic residue detections in memory and immediately renders the data file for display. CAD system 130 does not create new files in this embodiment. It is to be understood that these embodiments are not exclusive; other approaches to colonic imagery display, and in particular to the display of regions of interest, are known in the art and are within the scope of the methods set forth herein.

Colonic Residue & Polyp Visualization

Figure 4:
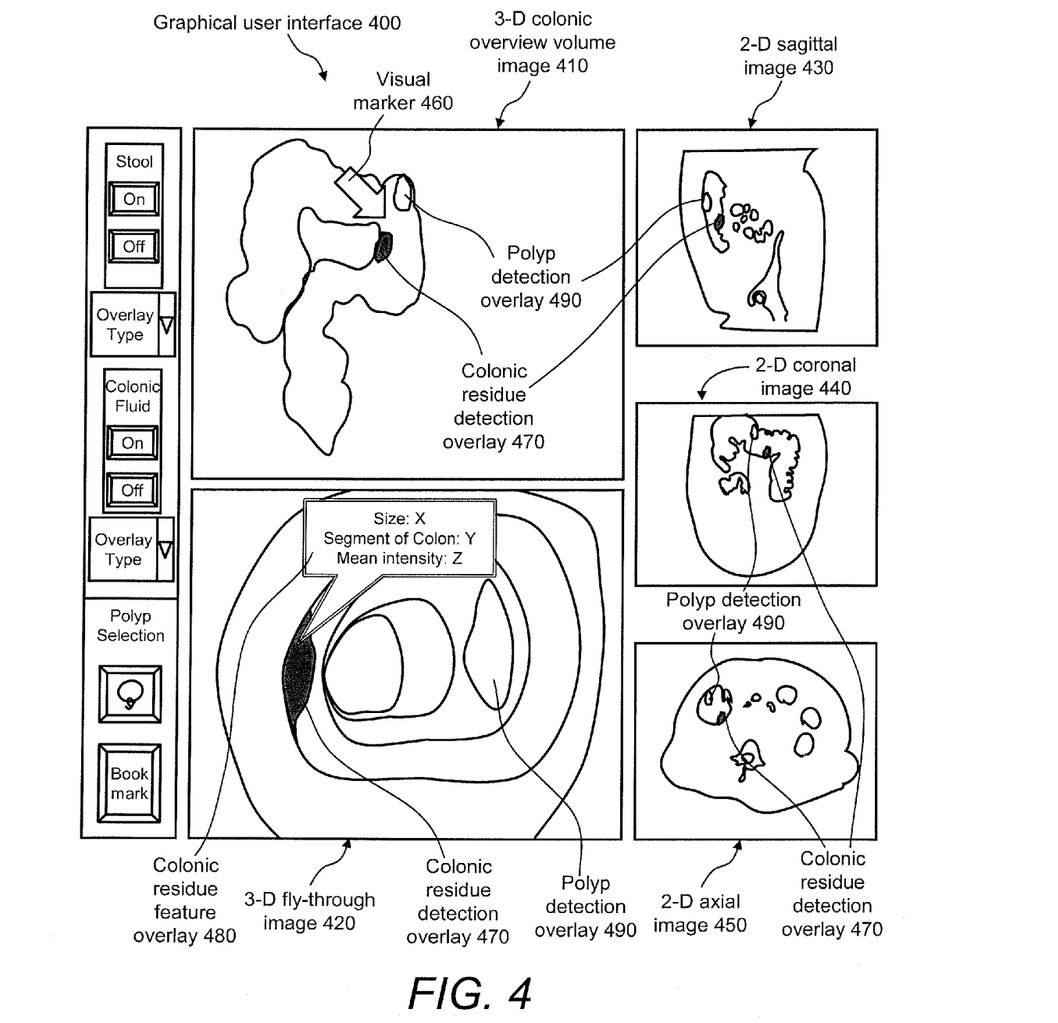
FIG. 4 is an illustration of a graphical user interface for the display and special depiction of colonic residue in medical imagery of the colon.

An illustration of an exemplary graphical user interface (GUI) 400 for the display and special depiction of colonic residue in medical imagery of the colon is presented in FIG. 4. Again, it is to be understood that this embodiment of an interface is exemplary only, and other GUIs or other interfaces may be utilized within the scope of the methods disclosed herein. GUI 400 may be considered an example of a computer-generated user interface for display on an output device such as GUI 150. GUI 400 depicts examples of planar, two-dimensional (2-D) and volumetric, three-dimensional (3-D) images in which the colonic residue detections and colonic residue display features of the methods disclosed herein are displayed to aid a radiologist in detection and diagnosis.

A 3-D colonic overview volume image 410 of the entire colon may be rendered and displayed from the reconstructed 3-D imagery of the colon. A 3-D fly-through image 420 of the colon may also be rendered and displayed that shows a particular region of the colon, much the way an optical probe in an optical colonoscopy would provide a view of the section of the colon being imaged by the probe. 3-D fly-through image 420 may be created using a volume (or ray-casting) technique, surface rendering technique, or other suitable technique known in the art for recreating a virtual fly-through of the colon.

Orthogonal (e.g. slice) views of the colon, which include one or more of a 2-D sagittal image 430, a 2-D coronal image 440, and/or a 2-D axial image 450 of the colon may further be rendered and displayed, with each slice corresponding to the location of 3-D fly-through image 420 and/or 3-D colonic overview volume image 410 as indicated by a visual marker 460 in the "parent" display. Visual marker 460 also may indicate to the user the location of the current 3-D fly-through image 420 in relation to the entire 3-D overview colon volume image 410. In each of the above images, an exemplary colonic residue detection overlay 470 is depicted and a corresponding colonic residue feature overlay 480 is shown in conjunction with 3-D fly-through image 420.

Colonic residue detection overlay 470 may be rendered in various ways so as to highlight the detections in each image. For example, as shown in FIG. 4, all colonic residue detections may be rendered using a first pattern to consistently highlight colonic residue across all imagery. Other examples of overlay techniques instead of patterns may be used to highlight colonic residue, such as, but not limited to, different colors, opacities, arrow colors pointing to each detection, legends or keys on the graphical user interface with indicators associating overlay techniques with the type of detection, etc. Optionally, colonic residue detection overlays (and/or features associated therewith) may be turned on and turned off in the CAD system via the graphical user interface or by other input means. The choice of overlay technique (e.g. pattern, color, etc.) may additionally be an option implemented and available to change in GUI 400. While patterns or colors may be employed in the methods disclosed herein, as to illustrate detections in volumetric images such as 3-D fly-through image 420, alternatively or in addition arrows may be employed, as to illustrate detections in planar images such as 2-D sagittal image 430, 2-D coronal image 440, and/or 2-D axial image 450.

Colonic residue feature overlays 480 may further be rendered in various ways so as to display the colonic residue display features calculated at step 250 of FIG. 2. For example, as shown in FIG. 4, all colonic residue display features may be rendered using a box that contains the feature values (size, segment of colon, mean intensity) and an arrow pointing to the colonic residue detection associated with the features. Colonic residue feature overlays may be available to turn on and turn off in review workstation 120. The overlay technique (e.g. box with arrow) may additionally be an option implemented and available to change in GUI 400. The display characteristics of the feature overlays may be varied depending on the value of the feature.

In one embodiment described above, the classification algorithm at step 240 identifies a unique class of "polyp-like" colonic residue that can be outputted and depicted differently from colonic residue exhibiting few or no feature characteristics of polyps. Thus, in an alternate embodiment of GUI 400, detections classified as "polyp-like" colonic residue may be rendered using a first overlay technique to consistently highlight only "polyp-like" colonic residue across the imagery. All other detections classified as non-polyp-like colonic residue may be rendered using a second overlay technique to consistently highlight non-polyp-like colonic residue across the imagery. Such a visual distinction may help radiologists to identify the colonic residue that carries the highest likelihood of being a false positive colonic residue detection reported by the CAD system using the methods disclosed herein, such as polyps exhibiting many characteristics of tagged stool. It further may allow the radiologist to ignore the non-polyp-like colonic residue detected by the CAD system, which could improve the radiologist's workflow.

The various images shown in GUI 400 are intended to highlight various ways that colonic imagery data, colonic residue detections, and colonic residue display features can be displayed in two-dimensional and three-dimensional image views. Additional planar (2-D) and volumetric (3-D)

views can be created using the CT or MR imagery acquired by acquisition station 110; from a 3-D reconstruction of the imagery computed by review workstation 120; from a subset of imagery, such as a segmented colon; or other suitable combinations of available imagery using known image processing techniques for calculating additional 2-D and 3-D views. Additionally, tools for marking detections (such as bookmarks) or automatically reviewing images (such as activating automatic fly-through of the entire colon) may be included in GUI 400. These alternatives are exemplary only, and other display alternatives will be known to persons of skill in the art and may be utilized with the methods disclosed herein. In addition, the displays discussed above may be presented alone or in conjunction with displays of other information relating to the colonic imagery, such as but not limited to the results of algorithms designed to detect polyps.

It is further noted that by showing the colonic residue detection overlays and associated colonic residue feature overlays automatically detected by the CAD system in at least a volumetric view of the colon (such as 3-D fly-through image 420), the methods disclosed herein may provide an improvement to a radiologist's ability to detect polyp false positives and false negatives, as radiologists who study three-dimensional representations of the colon may achieve higher polyp detection sensitivities than those studying two-dimensional representations. See P. J. Pickhardt and A. H. Dachman, "Missed Lesions at Primary 2D CT Colonography: Further Support for 3D Polyp Detection," *Radiology*, Feb. 1, 2008; 246(2): 6-8-649.

An illustrative workflow method of using GUI 400 in which a radiologist may identify false positives and false negatives of polyps in the medical imagery of a colon will now be described. A radiologist manually may identify one or more candidate polyp detections by reviewing any or all of the medical images output on GUI 400, such as 3-D colonic overview volume image 410, 3-D fly-through image 420, 2-D sagittal image 430, 2-D coronal image 440 and/or 2-D axial image 450. Polyp detections may be highlighted by the radiologist using selection, bookmark and other available tools in GUI 400. The radiologist then may activate the methods described herein for detecting colonic residue in the imagery using a "toggle on" feature of GUI 400. The colonic residue may then be automatically detected and rendered in the medical imagery as described in accordance with the methods described herein. The radiologist may then choose to review the imagery again, such as by activating fly-through mode, or skip directly to only the medical images and/or corresponding views containing at least one of the detections. In one embodiment, the radiologist may skip directly to only the medical images and/or corresponding views containing colonic residue detections. The colonic residue detections may prompt a radiologist to review additional polyp-like colonic residue previously unconsidered during the manual read. The colonic residue detections may prompt a radiologist to review a region of the colon that originally appeared to have a polyp, but upon application of colonic residue detections, have a significant amount of tagged stool in this region. The radiologist may then decide to inspect his or her original polyp detection more closely on the basis of colonic residue detections suggested. Feature overlays of other colonic residue in this region may further assist the radiologist during this inspection, resulting in improvements to the radiologist's speed and accuracy of diagnosis.

Polyps Obscured by Stool

Figure 5A:
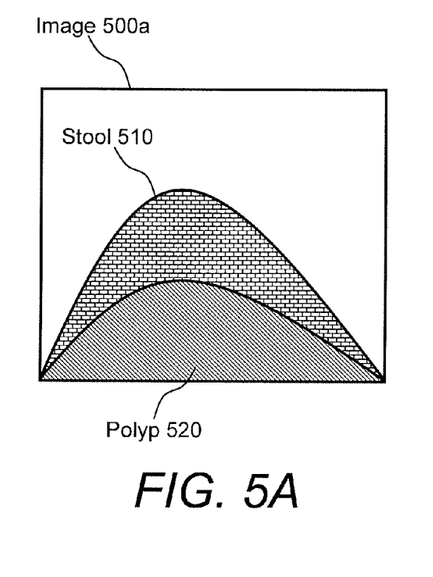
FIGS. 5A and 5B are illustrations of polyps that may be obscured by stool.
Figure 5B:
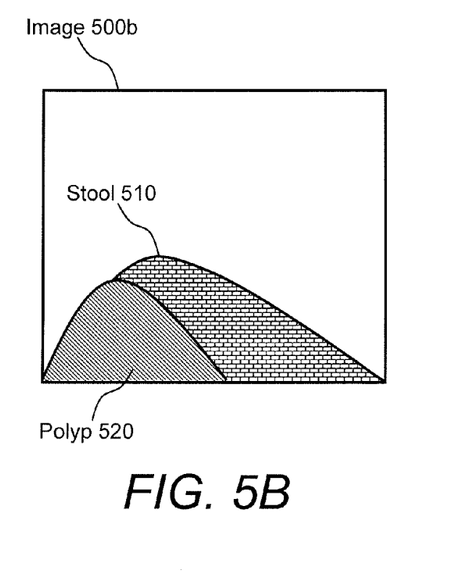

Several exemplary planar images 500*a* and 500*b* in which polyps 520 obscured by stool 510 are displayed in FIGS. 5A and 5B to illustrate the usefulness of the methods and systems disclosed herein. In FIG. 5A, stool 510 completely covers and obscures polyp 520. In FIG. 5B, stool 520 is attached to the side of polyp 520. Without the methods disclosed herein, polyp 520 could be missed by the radiologist due to stool 510. If stool 510 were electronically cleansed, portions of polyp 520 might be inadvertently removed and polyp 520 could be misinterpreted by the radiologist as a non-polyp. If the radiologist were able to detect polyp 520, it is possible that he or she could do so only by reviewing the various other planar views of the graphical user interface, which takes a significant amount of workflow time. Using the methods disclosed herein, a colonic residue detection would be visually displayed in a volumetric image or combination of volumetric image(s) and planar image(s) in the graphical user interface. This would help the radiologist to quickly determine that a different structure exists below stool 510, prompting the radiologist to take additional steps towards patient care that otherwise may have been avoided.

Exemplary Computer System

Figure 6:
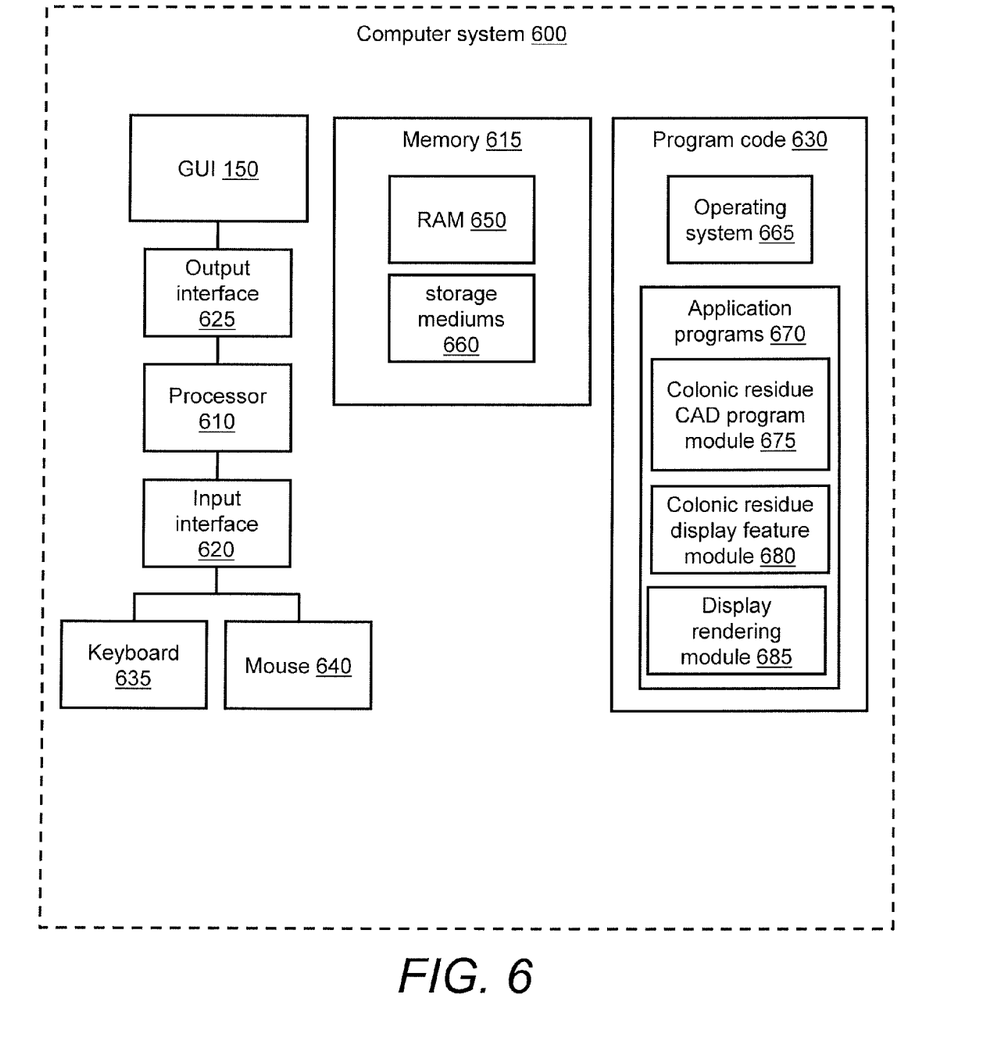
FIG. 6 is a block diagram of a computer system on which the methods disclosed herein may be practiced.

FIG. 6 is a block diagram of an illustrative computer system 600 on which the methods disclosed herein may be practiced. Other embodiments of computer systems, however, may be utilized. Computer system 600 may include acquisition station 110, review workstation 120, and CAD system 130, all of which were described in reference to FIG. 1 and may be suitable for practicing the methods disclosed herein. As shown in FIG. 6, computer system 600 may comprise a processor 610, a memory 615, an input interface 620, an output interface 625, and program code 630. Input interface 620 may connect processor 610 to an input device such as keyboard 635, mouse 640, or other suitable device for communicating commands from the device to the processor. Output interface 625 may further be connected to processor 610 and an output device such as a GUI 150.

Memory 615 may include conventional semiconductor random access memory (RAM) 650 or other forms of memory known in the art; and one or more computer readable-storage mediums 660, such as a hard drive, floppy drive, read/write CD-ROM, tape drive, etc. Stored in program code 630 may be an operating system 665 and application programs 670 with instructions that can be read and executed by computer system 600 for detecting and displaying colonic residue, polyps, and medical imagery of the colon in accordance with the methods disclosed herein. Application programs 670 may further comprise a colonic residue CAD program module 675 containing computer-implemented instructions for detecting and classifying colonic residue detections; a colonic residue display feature module 680 containing computer-implemented instructions for calculating display features of colonic residue detections detected by colonic residue CAD program module 675; and a display rendering module 685 for rendering and simultaneously displaying medical images of a human colon, colonic residue detections, and colonic residue display features on a suitable monitor or other GUI 150.

The methods disclosed herein for automatically detecting and displaying colonic residue can be implemented in conjunction with known methods and systems for automatically detecting and displaying polyps. The implementation of both in a CAD system may further improve a radiologist's ability to identify polyps, particularly those polyps exhibiting characteristics of colonic residue. Regions of the colon classified as polyps may be depicted specially from regions of the colon classified as colonic residue using the methods disclosed herein.

The invention claimed is:

1. A computer-implemented method for processing regions of interest in imagery of a colon, the method comprising: a) obtaining colonic imagery data relating to the colon; b) detecting at least one candidate colonic residue region in said colonic imagery data; c) for at least one said candidate colonic residue region detected, calculating a feature vector for said region; d) for at least one said candidate colonic residue region detected, for which a feature vector was calculated, determining a class for the said candidate colonic residue region using said feature vector and at least one statistical classifier; and e) for at least one class, outputting to at least one user at least one candidate colonic residue region belonging to said class.

2. The method of claim 1 wherein said colonic imagery data is a three-dimensional volume of the colon.

3. The method of claim 1 wherein detecting at least one candidate colonic residue region comprises executing at least one colonic residue detection algorithm.

4. The method of claim 3 wherein detecting at least one candidate colonic residue region further comprises executing at least one polyp detection algorithm.

5. The method of claim 1 wherein detecting at least one candidate colonic residue region comprises executing at least one polyp detection algorithm.

6. The method of claim 1 wherein detecting at least one candidate colonic residue region comprises segmenting the said at least one colonic residue region.

7. The method of claim 6 wherein segmenting said at least one candidate colonic residue region comprises reclassifying voxels surrounded by said candidate colonic residue region as colonic residue.

8. The method of claim 1 wherein said feature vector comprises at least one volumetric feature.

9. The method of claim 1 wherein said feature vector comprises a plurality of features.

10. The method of claim 1 wherein said feature vector comprises at least one feature that characterizes at least one of a presence of an air pocket or a variation of density of the said at least one colonic residue region.

11. The method of claim 10 wherein at least one of said features is an intensity-and/or gradient-based feature.

12. The method of claim 1 wherein said feature vector comprises at least one feature that characterizes homogeneity of the said at least one colonic residue region.

13. The method of claim 1 wherein said feature vector comprises at least one feature that characterizes a shape of the said at least one colonic residue region.

14. The method of claim 1 wherein said at least one statistical classifier is chosen from a group comprising a linear classifier, a quadratic classifier, a neural network, a decision-tree, a fuzzy logic classifier, a support vector machine (SVM), a Bayesian classifier, and a k-nearest neighbor classifier.

15. The method of claim 1 wherein said at least one statistical classifier is a committee of classifiers.

16. The method of claim 1 wherein the class is chosen from a group comprising a class of polyp-like colonic residue and a class of non-polyp-like colonic residue.

17. The method of claim 16 wherein outputting further comprises depicting said candidate colonic residue regions associated with the class of polyp-like colonic residue differently from candidate colonic residue regions associated with the class of non-polyp-like colonic residue.

18. The method of claim 1 further comprising calculating at least one colonic residue display feature for the at least one candidate colonic residue region.

19. The method of claim 18 wherein said colonic residue display feature is chosen from a group comprising a size of the candidate colonic residue region, a segment of the colon in which the candidate colonic residue region is located, a mean intensity of the candidate colonic residue region, a probability that the candidate colonic residue region is colonic residue, and a total amount of colonic residue detected in a segment of the colon in which the candidate colonic residue region is located.

20. The method of claim 1 wherein outputting at least one candidate colonic residue region and the class for said candidate colonic residue region comprises depicting candidate colonic residue regions belonging to said class specially.

21. The method of claim 1 wherein at least some colonic residue in the said colonic imagery data is tagged.

22. A computer-generated user interface for presenting a graphical representation of a colon, the user interface comprising a depiction of the colon; wherein regions of the colon having a feature vector classified by a statistical classifier as colonic residue are depicted specially.

23. The computer-generated user interface of claim 22 wherein said depiction of the colon is a planar image.

24. The computer-generated user interface of claim 22 wherein said depiction of the colon is a volumetric image.

25. The computer-generated user interface of claim 22 wherein said special depiction specially uses at least one of a color, opacity, pattern, arrow, legend, or key.

26. The computer-generated user interface of claim 22 further comprising at least one colonic residue feature overlay on said regions, said colonic residue feature overlays indicating a value of at least one feature of each said region.

27. The computer-generated user interface of claim 26 wherein said colonic residue feature overlays display at least one of a size of a candidate colonic residue region, a segment of the colon in which the candidate colonic residue region is located, a mean intensity of the candidate colonic residue region, a probability that the candidate colonic residue region is colonic residue, or a total amount of colonic residue detected in a region of the colon in which the candidate colonic residue region is located.

28. The computer-generated user interface of claim 22 wherein regions of the colon having a feature vector classified by at least one statistical classifier as a class of polyp-like colonic residue are depicted differently from regions of the colon having a feature vector classified by at least one statistical classifier as a class of non-polyp-like colonic residue.

29. A non-transitory computer readable storage medium having computer readable program code stored thereon, the computer readable program code being configured, when executed in a computer system comprising at least one user interface including at least one input device and at least one output device, to instruct the computer system to perform a method comprising:
  a) obtaining colonic imagery data relating to a colon;
  b) detecting at least one candidate colonic residue region in said colonic imagery data;
  c) for at least one said candidate colonic residue region detected, calculating a feature vector for said region;
  d) for at least one said candidate colonic residue region detected, for which a feature vector was calculated, determining a class for the said candidate colonic residue region using said feature vector and at least one statistical classifier; and
  e) for at least one class, outputting to at least one user at least one candidate colonic residue region belonging to said class.

30. The non-transitory computer readable storage medium of claim 29, wherein said feature vector comprises at least one volumetric feature.

31. The non-transitory computer readable storage medium of claim 29 wherein said feature vector comprises a plurality of features.

32. The non-transitory computer readable storage medium of claim 29 wherein said feature vector comprises at least one feature that characterizes at least one of a presence of an air pocket or a variation of density of the said at least one colonic residue region.

33. The non-transitory computer readable storage medium of claim 32 wherein at least one of said features is an intensity- and/or gradient-based feature.

34. The non-transitory computer readable storage medium of claim 29 wherein said feature vector comprises at least one feature that characterizes homogeneity of the said at least one colonic residue region.

35. The non-transitory computer readable storage medium of claim 29 wherein said feature vector comprises at least one feature that characterizes a shape of the said at least one colonic residue region.

36. The non-transitory computer readable storage medium of claim 29 wherein said at least one statistical classifier is chosen from a group comprising a linear classifier, a quadratic classifier, a neural network, a decision-tree, a fuzzy logic classifier, a support vector machine (SVM), a Bayesian classifier, and a k-nearest neighbor classifier.

37. The non-transitory computer readable storage medium of claim 29 wherein the class is chosen from a group comprising a class of polyp-like colonic residue and a class of non-polyp-like colonic residue.

38. The non-transitory computer readable storage medium of claim 37 wherein outputting further comprises depicting said candidate colonic residue regions associated with the class of polyp-like colonic residue differently from candidate colonic residue regions associated with the class of non-polyp-like colonic residue.

39. The non-transitory computer readable storage medium of claim 29 wherein the said method further comprises calculating at least one colonic residue display feature for the at least one candidate colonic residue region.

40. The non-transitory computer readable storage medium of claim 39 wherein said colonic residue display feature is chosen from a group comprising a size of the candidate colonic residue region, a segment of the colon in which the candidate colonic residue region is located, a mean intensity of the candidate colonic residue region, a probability that the candidate colonic residue region is colonic residue, and a total amount of colonic residue detected in a segment of the colon in which the candidate colonic residue region is located.

41. The non-transitory computer readable storage medium of claim 29 wherein outputting at least one candidate colonic residue region and the class for said candidate colonic residue region comprises depicting candidate colonic residue regions belonging to said class specially.

42. A non-transitory computer readable storage medium having computer readable program code stored thereon, the computer readable program code being configured, when executed in a computer system comprising at least one user interface including at least one input device and at least one output device, to instruct the computer system to present to a user a depiction of the colon; wherein regions of the colon having a feature vector classified by a statistical classifier as colonic residue are depicted specially.

43. The non-transitory computer readable storage medium of claim 42 wherein said special depiction specially uses at least one of a color, opacity, pattern, arrow, legend, or key.

44. The non-transitory computer readable storage medium of claim 42, wherein the said depiction of the colon further comprises at least one colonic residue feature overlay on said regions, said colonic residue feature overlays indicating a value of at least one feature of each said region.

45. The non-transitory computer readable storage medium of claim 44 wherein said colonic residue feature overlays display at least one of a size of a candidate colonic residue region, a segment of the colon in which the candidate colonic residue region is located, a mean intensity of the candidate colonic residue region, a probability that the candidate colonic residue region is colonic residue, or a total amount of colonic residue detected in a region of the colon in which the candidate colonic residue region is located.

46. The non-transitory computer readable storage medium of claim 42 wherein regions of the colon having a feature vector classified by at least one statistical classifier as a class of polyp-like colonic residue are depicted differently from regions of the colon having a feature vector classified by at least one statistical classifier as a class of non-polyp-like colonic residue.

47. A computer-generated user interface for providing a graphical representation of a colon, the user interface including a depiction of the colon; wherein regions of the colon are depicted that have a colonic residue feature vector classified as colonic residue by a statistical classifier using a feature vector calculated for candidate colonic residue regions.

* * * * *